US012583611B2

(12) United States Patent
Rawdon et al.

(10) Patent No.: US 12,583,611 B2
(45) Date of Patent: Mar. 24, 2026

(54) METHODS AND SYSTEMS FOR VENTING A FUEL TANK ON A BLENDED WING BODY AIRCRAFT

(71) Applicant: JetZero, Inc., Long Beach, CA (US)

(72) Inventors: Blaine Knight Rawdon, Riverside, CA (US); Ronald Tatsuji Kawai, Rancho Palos Verdes, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/867,851

(22) Filed: Jul. 19, 2022

(65) Prior Publication Data

US 2024/0025556 A1 Jan. 25, 2024

(51) Int. Cl.
| | |
|---|---|
| *B64D 37/20* | (2006.01) |
| *B64C 39/10* | (2006.01) |
| *B64D 27/24* | (2024.01) |
| *B64D 37/30* | (2006.01) |

(52) U.S. Cl.
CPC ............ *B64D 37/20* (2013.01); *B64D 27/24* (2013.01); *B64D 37/30* (2013.01); *B64C 2039/105* (2013.01)

(58) Field of Classification Search
CPC ........ B64D 37/14; B64D 37/20; B64D 37/24; B64D 37/34
See application file for complete search history.

(56) References Cited

U.S. PATENT DOCUMENTS

| | | | | |
|---|---|---|---|---|
| 3,632,235 A | * | 1/1972 | Grenci | F17C 5/06 |
| | | | | 417/901 |
| 3,757,753 A | | 9/1973 | Hunt | |
| 4,065,278 A | * | 12/1977 | Newton | F25J 1/0035 |
| | | | | 62/622 |
| 4,515,189 A | | 5/1985 | Mowatt-Larssen | |
| 5,231,838 A | | 8/1993 | Cieslukowski | |
| 5,575,441 A | * | 11/1996 | Gervais | B64D 37/14 |
| | | | | 141/331 |
| 5,816,287 A | * | 10/1998 | Hyodo | F02M 25/089 |
| | | | | 123/519 |
| 6,123,295 A | * | 9/2000 | Wexler | B64G 1/14 |
| | | | | 244/119 |
| 11,092,111 B1 | | 8/2021 | Bridges et al. | |
| 2002/0116931 A1 | | 8/2002 | Lak et al. | |
| 2004/0154314 A1 | | 8/2004 | Fischer et al. | |
| 2005/0224514 A1 | | 10/2005 | Westenberger | |
| 2006/0162705 A1 | | 7/2006 | Grunwald et al. | |
| 2007/0199941 A1 | | 8/2007 | Reese | |
| 2010/0212329 A1 | | 8/2010 | Bridgwood | |
| 2011/0042520 A1 | * | 2/2011 | Glaser | B64F 1/28 |
| | | | | 141/1 |
| 2013/0192297 A1 | | 8/2013 | Mak | |
| 2014/0020408 A1 | | 1/2014 | Berchowitz | |
| 2014/0026597 A1 | | 1/2014 | Epstein et al. | |
| 2014/0209070 A1 | * | 7/2014 | Gleeson | F28D 7/0008 |
| | | | | 123/543 |

(Continued)

*Primary Examiner* — Ashesh Dangol
(74) *Attorney, Agent, or Firm* — Jeffrey Schox

(57) ABSTRACT

Methods and systems for venting a fuel tank includes a fuel tank on a blended wing body aircraft. A fuel tank may include a vent. A vent line is connected to the vent. The vent line is heated. The vent line is attached to an external fuel tank configured to store the collected boil-off gaseous fuel from the aircraft fuel tank.

15 Claims, 7 Drawing Sheets

(56)         References Cited

U.S. PATENT DOCUMENTS

| 2014/0216404 A1* | 8/2014 | Armesto | ........... F02M 37/0052 |
| | | | 123/445 |
| 2015/0007585 A1* | 1/2015 | Kawai | ................... B64D 37/30 |
| | | | 62/48.2 |
| 2015/0217153 A1* | 8/2015 | Jones | .................... B64D 37/02 |
| | | | 169/62 |
| 2015/0321767 A1 | 11/2015 | Kamath et al. | |
| 2015/0330575 A1 | 11/2015 | Epstein et al. | |
| 2015/0344144 A1 | 12/2015 | Kamath et al. | |
| 2019/0224589 A1* | 7/2019 | Dyer | ................. B01D 19/0005 |
| 2020/0369145 A1 | 11/2020 | Gralde et al. | |
| 2021/0402872 A1* | 12/2021 | Rignäs | ............... H01M 10/663 |

* cited by examiner

304a

304b

300

505

Connecting a Vent Line to a Fuel Tank in a Grounded BWB Aircraft, wherein the Fuel Tank Contains Liquefied Gas Fuel and the Vent Line Contains Gaseous Hydrogen

510

Heating the Vent Line

515

Collecting the Gaseous Fuel in an External Fuel Tank

500

1

METHODS AND SYSTEMS FOR VENTING A FUEL TANK ON A BLENDED WING BODY AIRCRAFT

FIELD OF THE INVENTION

The present invention generally relates to the field of liquified gas fuel storage. In particular, the present invention is directed to methods and systems for venting a fuel tank on a blended wing body aircraft.

BACKGROUND

Liquified gas fuel has characteristics favorable as an aviation fuel. However, due to the low boiling point of liquified gas fuel, storage of fuel must factor in additional pressure from liquified gas fuel boil-off.

SUMMARY OF THE DISCLOSURE

In an aspect a method for venting a fuel tank includes connecting a vent line to a fuel tank in a grounded blended wing body (BWB) aircraft, wherein the fuel tank contains liquified gas fuel, heating the vent line, and collecting the gaseous fuel in an external fuel tank.

In another aspect a system for venting a fuel tank includes a grounded blended wing body aircraft, a vent line connected to a fuel tank in the grounded BWB aircraft, and an external fuel tank configured to collect the gaseous fuel boil-off from the fuel tank in the grounded BWB.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for venting a fuel tank. In an embodiment, fuel tank is located on a blended wing body aircraft. Fuel tank is pressurized and contains liquified gas fuel. Over time, liquified gas fuel may warm and produce boil-off, located at the top of the fuel tank. A vent located at the top of the fuel tank may be connected to a vent line, configured to vent out the gaseous fuel from the fuel tank to an external fuel tank off of the aircraft.

Aspects of the present disclosure are only used on a grounded aircraft. A grounded aircraft is an aircraft that is not ready to fly. Grounded aircrafts often occur during maintenance and during periods where the aircraft is not in use.

Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1. Furthermore, there is no intention to be bound by any expressed or implied theory presented in this disclosure.

Figure 1:
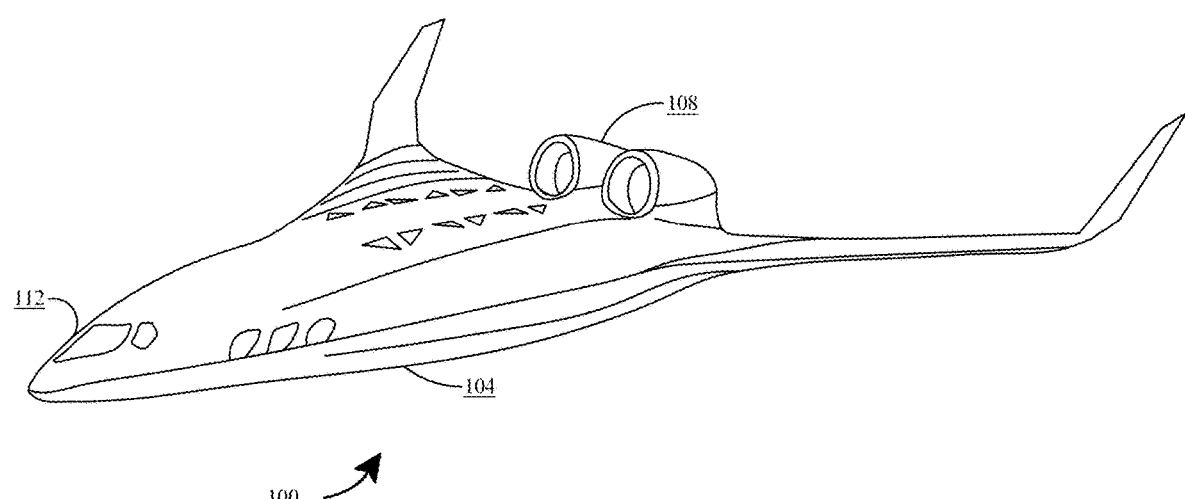
FIG. 1 is a schematic of an exemplary blended wing aircraft.

Referring to FIG. 1, an exemplary blended wing aircraft 100 is illustrated. Aircraft 100 may be a liquid gas aircraft. A liquid gas aircraft may operate by using gas as fuel. A liquid gas aircraft may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage 116. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contains an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 1, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion of a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude", for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of an aircraft 100.

With continued reference to FIG. 1, in some cases, aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component 108 may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component 108 may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 112 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1, aircraft 100 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, aircraft 100 may include a flight component 108 that includes at least a nacelle 108. For the purposes of this disclosure, a "nacelle" is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1, in nonlimiting embodiments, at least a flight component 108 may include an airbreathing engine such as a jet engine, turbojet engine, turboshaft engine, ramjet engine, scramjet engine, hybrid propulsion system, turbofan engine, or the like. At least a flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
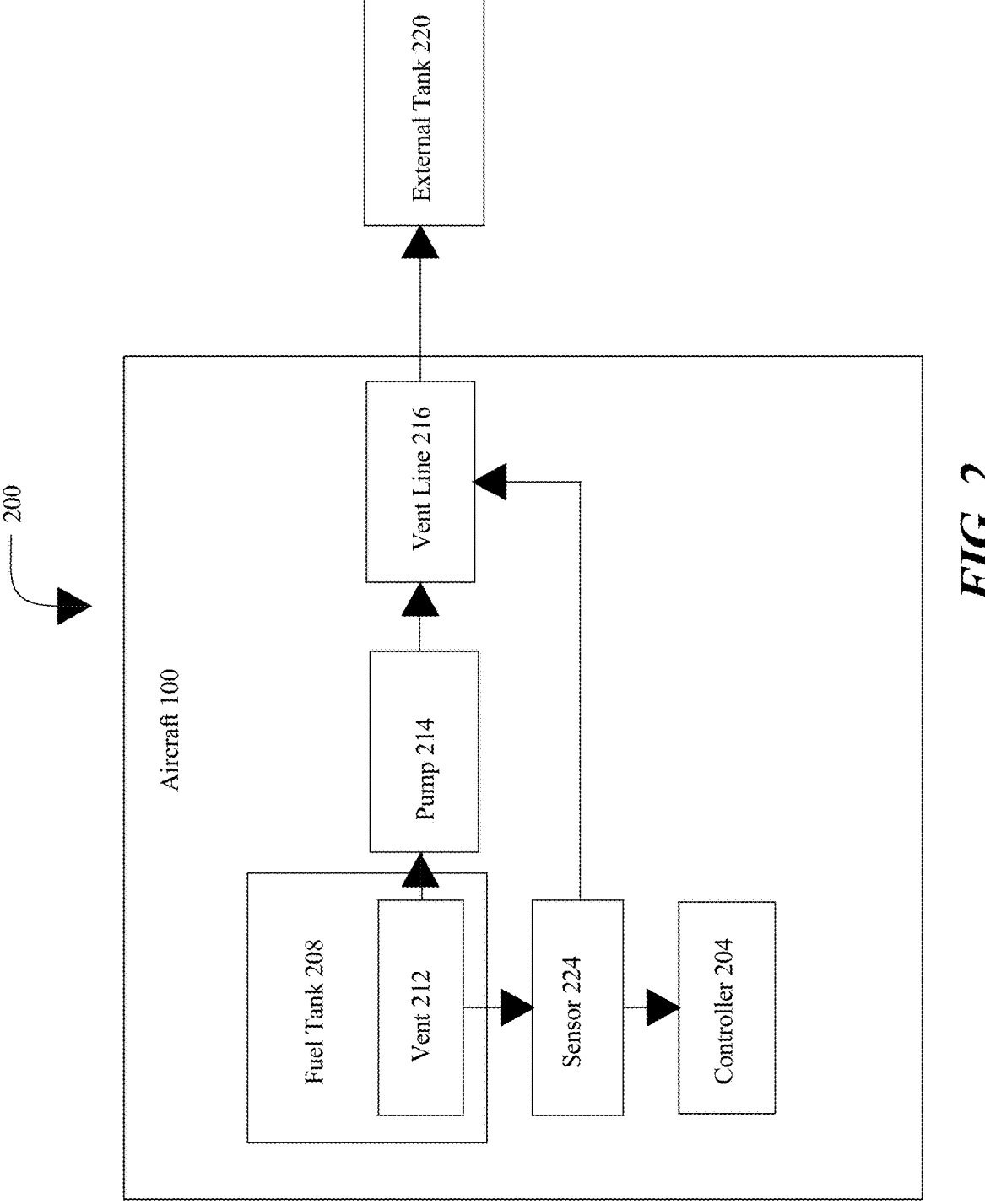
FIG. 2 is a block diagram of a system for venting fuel tanks.

Referring now to FIG. 2, an exemplary embodiment of a system 200 for venting a fuel tank is illustrated. System may include a computing device such as a controller. Controller 204 may include any computing device as described in this disclosure, including without limitation a microcontroller, microprocessor, digital signal processor (DSP) and/or system on a chip (soc) as described in this disclosure. Computing device may include, be included in, and/or communicate with a mobile device such as a mobile telephone or smartphone. Controller 204 may include a single computing device operating independently, or may include two or more computing device operating in concert, in parallel, sequentially or the like; two or more computing devices may be included together in a single computing device or in two or more computing devices. Controller 204 may interface or communicate with one or more additional devices as described below in further detail via a network interface device. Network interface device may be utilized for connecting controller 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) May be communicated to and/or from a computer and/or a computing device. Controller 204 may include but is not limited to, for example, a computing device or cluster of computing devices in a first location and a second computing device or cluster of computing devices in a second location. Controller 204 may include one or more computing devices dedicated to data storage, security, distribution of traffic for load balancing, and the like. Controller 204 may distribute one or more computing tasks as described below across a plurality of computing devices of computing device, which may operate in parallel, in series, redundantly, or in any other manner used for distribution of tasks or memory between computing devices. Controller 204 may be implemented using a "shared nothing" architecture in which data is cached at the worker, in an embodiment, this may enable scalability of system 200 and/or computing device.

With continued reference to FIG. 2, controller 204 may be designed and/or configured to perform any method, method step, or sequence of method steps in any embodiment described in this disclosure, in any order and with any degree of repetition. For instance, controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 2, system 200 includes a fuel tank 208 (sometimes referred to as a "tank"). In this disclosure, a "fuel tank" is a container of fuel, which is often flammable. In an embodiment, a fuel tank 208 stores fuel, such as a liquified gas fuel, to power aircraft 100. As used in this disclosure, a "liquified gas fuel" is a fuel that at standard atmospheric conditions or when utilized (e.g., combusted) is gas and is stored as a fuel. Liquified gas fuels include without limitation liquid hydrogen, propane, and liquified natural gas. A fuel tank 208 may be permanently attached to aircraft 100. As used in this disclosure, a tank may be "permanently attached" when it is configured to not be removed during ordinary use. For example, a tank permanently attached to aircraft may be removed during maintenance or overhaul but is otherwise a permanent flight component of the aircraft. A fuel tank 208 of a plurality of fuel tanks may include one or more compartments to store fuel in. A fuel tank 208 of a plurality of fuel tanks may be a part of fuel delivery system for an engine, in which the fuel may be stored inside a fuel tank and then propelled or released into an engine, such as without limitation a combustion engine. Tank 208 may be a pressure vessel. A "pressure vessel" is a container configured to hold fluids at a pressure that may differ from an ambient pressure. Pressure vessel may be configured to be pressurized in order to allow flow of gaseous fuel from a tank 208, for example without a need to pump. In an embodiment, but without limitation, a tank 208 may act as a pressure vessel to store the fuel at a high pressures above 5 psig, 15 psig, 50 psig, or the like. A tank 208 may be made of any material able to withstand such high pressure, such as but without limitation, aluminum, carbon fiber, composite materials, or the like. Furthermore, a tank 208 may further include an inner wall and an outer wall. As used herein, an "inner wall" is the inner barrier of a tank that is in contact with the fuel. As used herein, an "outer wall" is the outer barrier of a tank that is exposed to the outside. There may be insulation between the outer and inner wall. A tank 208 may also include safety valves, closures, vessel threads, or any other features that can be found on fuel tanks. Tank 208 may further have a tank geometry. "Tank geometry" refers to an overall shape and arrangement of tank 208. Tank 208 may have a multi-lobe geometry, such that the multi-lobe geometry includes one or more curvatures. As used herein, "multi-lobe geometry" refers to a shape include multiple curvatures or "lobes". A "lobe" as used herein, is a curved section of the multi-lobe geometry. Multi-lobe geometry may have multiple lobes, wherein the start of one lobe is marked by a discontinuation in the curvature. A discontinuation in the curvature may occur when the curvature of a tank switches between two non-adjacent values instantaneously or substantially instantaneously. The curvature of the tank may switch substantially instantaneously when there is a weld or other fastener or a division such as a septum. In other embodiments, the curvature may switch substantially instantaneously, when, for example, two lobes of a tank meet, but the intersection has been rounded or otherwise altered in order to, among other things, reduce stress concentrations at the intersection point. For example the tank 208 may have one or more surfaces with spherical and/or cylindrical shapes. Each lobe of the multi-lobe tank geometry may be configured to have a different radius. Tank 208 may include variable diameter and length. A lobe may be defined as a single sphere or cylinder of the plurality of spheres and/or cylinders. According to some embodiments, tank geometry for a blended wing body aircraft 104 may be driven by at least five objectives: (1) to provide as much fuel volume as possible while using little payload floor space, (2) to provide a fuel tank shape that resists pressure and that is lightweight, (3) to provide a fuel tank shape that can be insulated between outer wall and inner wall, (4) to provide a fuel center of gravity that is not widely misaligned with the aircraft's center of gravity, and (5) to provide fuel tanks that are compatible with a passenger cabin. In this disclosure, a "fuel center of gravity" is the center of gravity of the fuel inside tank 208. In some cases, fuel center of gravity may affect overall aircraft center of gravity. Fuel center of gravity may be associated with a volume within airplane that has sufficient volume to store a practical quantity of fuel in discrete tanks. Tank 208 may be arranged inside blended wing body as a function of its fuel center of gravity in relation to center of gravity of aircraft 100. Fuel tanks and tank geometry may be consistent with fuel tanks and tank geometries discussed in U.S. patent application Ser. No. 17/731,728, filed on Apr. 28, 2022, and titled "AN AIRCRAFT WITH FUEL TANKS STORED AFT OF A CABIN IN A MAIN BODY AND A METHOD FOR MANUFACTURING".

Continuing to reference FIG. 2, fuel tank 208 may include a vent 212. As used in this disclosure, a "vent" is an opening and/or aperture configured to allow one or more fluids to pass. In an embodiment, a vent 212 may be configured to vent gaseous fuel from tank 208. Gaseous fuel may result from boil-off of liquified gas fuel as the fuel warms. In an embodiment, and without limitation, a vent 212 may be configured to vent boil-off from tank 208. Vent 212 may be located near the vapor ullage at the top of the tank 208. As used herein, a "vapor ullage" is a volume of vapor above a liquid in a tank. Vent 212 may also be located at the bottom of the tank, where the fuel is still liquid, to provide liquid fuel. Liquified gas fuel, such as liquid hydrogen fuel (LH2) must be heated into a vapor to be used as fuel for the aircraft. Fuel tank 208 may include more than one vent. For example, fuel tank 208 may include two vents, one at the top of the tank, one at the bottom of the tank. In some cases, a vent 212 may include a check valve. As used in this disclosure, a "check valve" is a valve that permits flow of a fluid only in certain (e.g., one) directions. In some cases, check valve may be configured to allow flow of fluids substantially only away from tank 208 while preventing back flow of vented fluid to tank 208. Vent 212 may also include a pressure regulator. A "pressure regulator" is a type of valve that controls the pressure of a fluid. Venting gaseous fuel from a tank 208 prevents over-pressurizing or other events that may cause catastrophic damage or harm. It may also desirable, when aircraft 100 is grounded, to connect a system of lines and tanks to at least a vent 212 to collect the boiled-off hydrogen. In some cases, the collected gaseous fuel can be compressed by a pump into storage tanks and then cooled to liquid temperatures for reuse as aircraft fuel.

Continuing to reference FIG. 2, fuel tank 208 is connected to a vent line 216. As used herein, a "vent line" is a tether or a bundle of tethers, e.g., hose, tubing, cables, wires, and the like, which is configured to removably attach with a mating component of a vent of a fuel tank 208. Vent line 216 may be made of a rigid or a flexible material. For example, vent line 216 may be composed of polypropylene, polycarbonate, acrylonitrile butadiene styrene, polyethylene, nylon, polystyrene, polyether ether ketone, and the like. Vent line 216 may also be composed of metals such as carbon fiber, aluminum, titanium, copper, or the like. Vent line 216 may be attached to a vent 212 located at the top of the tank 208 such that vent line 216 directs gaseous fuel from the vent 212 to an external fuel tank 220. External fuel tank 220 may be consistent with any fuel tank as disclosed herein. External fuel tank 220 (also referred to as "external tank") is discussed in further detail below. Vent line 216 may be configured to direct gaseous fuel overboard, wherein overboard means off of the aircraft 100. While aircraft 100 is grounded, aircraft engine and other systems are not using hydrogen vapor. Because of this, boil-off from the liquid fuel is collected through a vent line 216 to an external fuel tank 220. Vent line 216 may include a valve near the external fuel tank 220. In an embodiment, if external air reaches the cold portion of the aircraft's vent line 216 (near tank 208), it may freeze and block the vent 212. To prevent external air from getting into system 200, a valve may be used.

Continuing to reference FIG. 2, vent line 216 may include a pump 214 to move gaseous fuel from the fuel tank 208 to the external tank 220. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed.

Continuing to reference FIG. 2, vent line 216 may be insulated to prevent the accumulation of frozen gases, such as frozen water vapor. The boiling point of hydrogen is −423.2 F, which may be the freezing point of other gases. For example, water/water vapor freezes at 32 F. In an embodiment, insulation may include vermiculite, fiberglass, X-Aerogel, crosslinked Aerogel, firebrick, or any other insulation with a low thermal conductivity coefficient. A low thermal conductivity may be any thermal conductivity less than 0.10, 0.01, or 0.001 W/m-k. In this disclosure, "insulation" is a component or layer configured to reduce heat transfer. Insulation may limit heat transfer by conduction. Insulation may surround the vent line. In some embodiments, insulation may surround the circumference of vent line. In some embodiments, insulation may partially surround the circumference of the vent line. Alternatively or additionally, vent line 216 may include an inner wall and an outer wall, wherein a vacuum resides in between. As used herein, an "inner wall" is the inner barrier of a vent line that would be in contact with the gaseous fuel. As used herein, an "outer wall" is the outer barrier of a vent line that is in contact with an environment outside the vent line. In some embodiments, there may be insulation between the outer and inner wall. In some embodiments, there may be a vacuum as an insulation between the outer and inner wall.

With continued reference to FIG. 2, Additionally or alternatively, a heat exchanger may be configured to heat vent line 216. For example, in some cases, a heat exchanger including a hot fluid channel may surround the vent line 216. As used in this disclosure, a "heat exchanger" is any device configured to transfer heat from a first fluid or medium to a second fluid or medium. A "channel", as used herein, is a component that is substantially impermeable to gases and contains and/or directs a flow of hot fluid. A depiction of a vent line can be seen in FIG. 4. Channel may act as a heat exchanger between the hot fluid and the cold gaseous fuel. Hot fluids may include oils, air, water, propylene glycol, ethylene glycol, or the like. Additionally or alternatively, heat may be provided by a powered heat source such as a radiator, electric resistance heater, combustion heater, or the like. Powered heat source may be placed around the vent line to heat the cold gaseous fuel. Powered heat source may be places around the hot fluid channel to heat the hot fluid that may heat the cold gaseous fuel. In some embodiments, powered heat source may run down the length of vent line to heat the cold gaseous fuel. In some embodiments, powered heat source may run down the length of hot fluid channel to heat the hot fluid. Heat elements may surround the vent line to prevent an accumulation of frozen air and/or water vapor.

Continuing to reference FIG. 2, system 200 may include a sensor 224. In some embodiments, sensor 224 may be configured to detect the pressure within tank 208. In some embodiments, sensor 224 may be a pressure sensor. Sensor 224 may detect when pressure within the tank 208 increases above a threshold pressure. In an embodiment, a controller 204 may be communicatively connected to sensor 224.

Controller 204 may be onboard the aircraft or remote from the aircraft. Sensor 224 may send pressure data to controller 204 and controller 204 may determine when to open vent 212 based on the pressure. A threshold may be set by a user to determine when vent 212 should open. Threshold pressure may be a 0.01%, 0.1%, or 1% increase in pressure. In some embodiments, threshold pressure may be 3% or 5% greater than the operating pressure inside tank 208.

With continued reference to FIG. 2, additionally, sensor 224 may detect when a vent line 216 is connected to vent 212. Vent 212 may be a check valve, as discussed above, that may only open when a vent line 216 is connected to the vent 212. Additionally, vent line 216 may only be connected to vent 212 when aircraft is grounded. "Grounded" as used herein, is when the aircraft is prevented from flying. An aircraft may be grounded during maintenance. An aircraft may be grounded when the aircraft is not in operation to carry cargo or passengers. Vent line 216 may be physically connected to vent 212 by a user, such as a maintenance worker. Sensor 224 may be consistent with any sensor as discussed above.

Continuing to reference FIG. 2, sensor 224 may be a motion sensor. Motion sensor may detect when a vent line is connected to a vent. A motion sensor refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. A motion sensor may include, torque sensor, gyroscope, accelerometer, position, sensor, magnetometer, inertial measurement unit (IMU), pressure sensor, force sensor, proximity sensor, displacement sensor, vibration sensor, or the like. In one or more embodiments, sensor 224 may include various other types of sensors configured to detect a pressure of a tank 208 and/or a vent line connection. For instance, sensor 224 may include photoelectric sensors, radiation sensors, infrared sensors, and the like. Sensor 224 may include contact sensors, non-contact sensors, or a combination thereof. In one or more embodiments, sensor 224 may include digital sensors, analog sensors, or a combination thereof. Sensor 224 may include digital-to-analog converters (DAC), analog-to-digital converters (ADC, A/D, A-to-D), a combination thereof, or other signal conditioning components used in transmission of measurement data to a destination, such as computing device 148, over a wireless and/or wired connection.

Still referring to FIG. 2, vent line 212 connects the fuel tank 208 to the external tank 220. External tank 220 collects the gaseous fuel boil-off from the fuel tank 208 in the grounded aircraft 100. External tank 220 may collect the gaseous fuel boil-off and re-liquefy it back into liquid fuel to be reused in the aircraft. The process of re-liquefying the gaseous fuel may include using a refrigeration cycle to lower the temperature of the gaseous fuel back into a liquid state. Re-liquefying gaseous fuel may include cooling down the gas below the boiling point of 21K and pressurizing it to around 13 bar. Refrigeration cycle may include condensers, throttle valves, compressors, and heat exchangers. As used herein, a "refrigeration cycle" is a thermodynamic cycle wherein heat is transferred from a body with lower temperature to a body with higher temperature. In an embodiment, refrigeration cycle may include using a compressor to compress the gaseous fuel from a low-pressure state to a high-pressure state. A condenser may use a refrigerant fluid to remove heat from the high-pressure vapor gas. Refrigerant may act as an heat exchanger wherein the gas cools down and the refrigerant increases in heat. A throttle valve may be used to create a drop in pressure in the refrigerant. In some embodiments, a pump, as disclosed above, may be used to move the refrigerant fluid. A pump, as disclosed above, may be used to compress gaseous fuel. External tank 220 may store the re-liquefied gaseous fuel, and/or the liquid hydrogen may be transferred into additional storage tanks. Additional storage tanks may be consistent with any fuel tank as discussed above. In some embodiments, air in vent line and/or downstream system may pose a problem. For example, if air reaches a cold portion of the airplane's internal vent line, the air may freeze and block the vent. Also, in some cases, moisture (e.g., water vapor) in air may freeze at an even higher temperature (e.g., 32° F.) and block vent line. Accordingly, in some embodiments, system is designed to prevent air from getting into the airplane's vent system. In some cases, a valve near a fitting that couples to an external vent line may be used to vent air and/or moisture. In some cases, an ongoing (and slow) flow of gaseous hydrogen from tank may help to prevent ingress of air and/or moisture, as the line is self-purging and pressurized, thereby preventing unpressurized air and/or moisture from entering through a valve.

Figure 3:
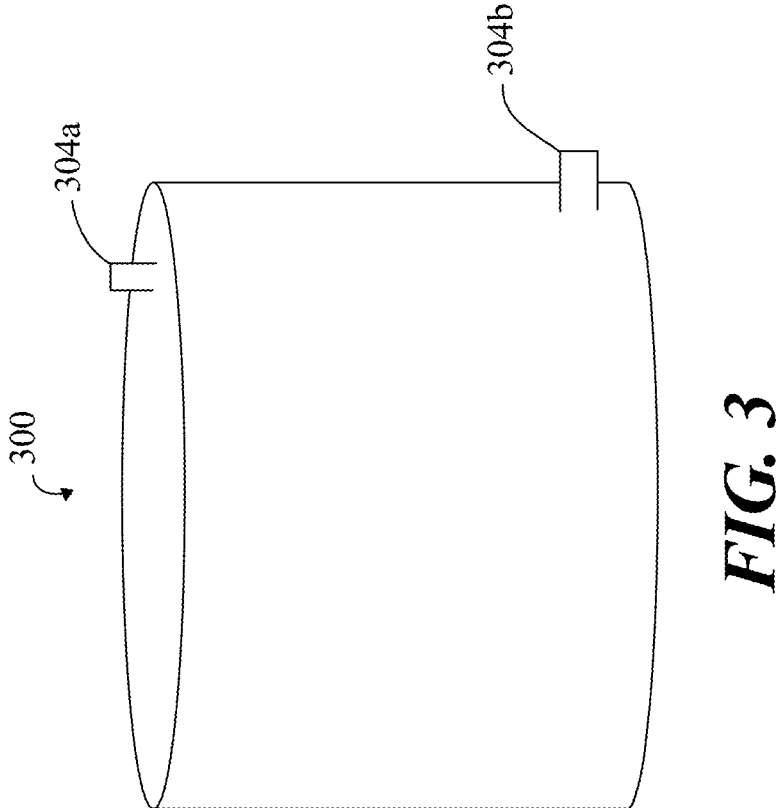
FIG. 3 is a schematic of a fuel tank.

Now referring to FIG. 3, an exemplary embodiment of a tank 300. Tank 300 may be consistent with any tank as discussed herein. Tank 300 may be an embodiment of tank 212 or external tank 220. A key component that may heavily impact shape of tank 300 is pressure. Tank 300 may be far lighter if pressure is resisted in pure or predominantly tension as compared to bending. In pure tension, thin-walled tanks may be used. Thin-walled tanks may be lighter than thick-walled tanks as less material is used. In some embodiments, pure tension in a tank may be generally achieved by shapes that provide a circular cross section, including spheres, cylinders, and cones. In an embodiment, a pressurized tank of a given volume may be made as a sphere to place the tank in pure tension. Alternatively, a tank made as a cube may require tank walls to operate in bending; thus, the cube tank would likely be vastly heavier than a sphere tank of similar volume. Cube tanks may be heavier as thick walls may be necessary to resist bending. Accordingly, in some embodiments, any tank geometry may provide tank walls acting in tension. Tank 300 may include a vent 304. Vent 304 may be consistent with any vent as discussed herein. Vent 304 may be located on top of the tank 300 or at the bottom of tank 300. Vent 304*a*, located at the top of the tank 300, may provide gaseous fuel to an engine of aircraft 100. Vent 304*b*, located at the bottom of the tank 300 provides liquid fuel that may be heated to provide gaseous fuel to an engine of the aircraft 100. Vent line 212 may connect to vent 304*a*, as vent 304*a* may be near the vapor ullage. Because liquid fuel and gaseous fuel are both very cold, the heating of liquid fuel may be provided by waste heat from another system of the aircraft 100. "Waste heat", as used herein, is excess heat from a system. In an embodiment, heat generated from friction in the propulsors may be used to provide heating to the liquified gas fuel, and the liquified gas fuel may provide cooling to the propulsors.

Figure 4A:
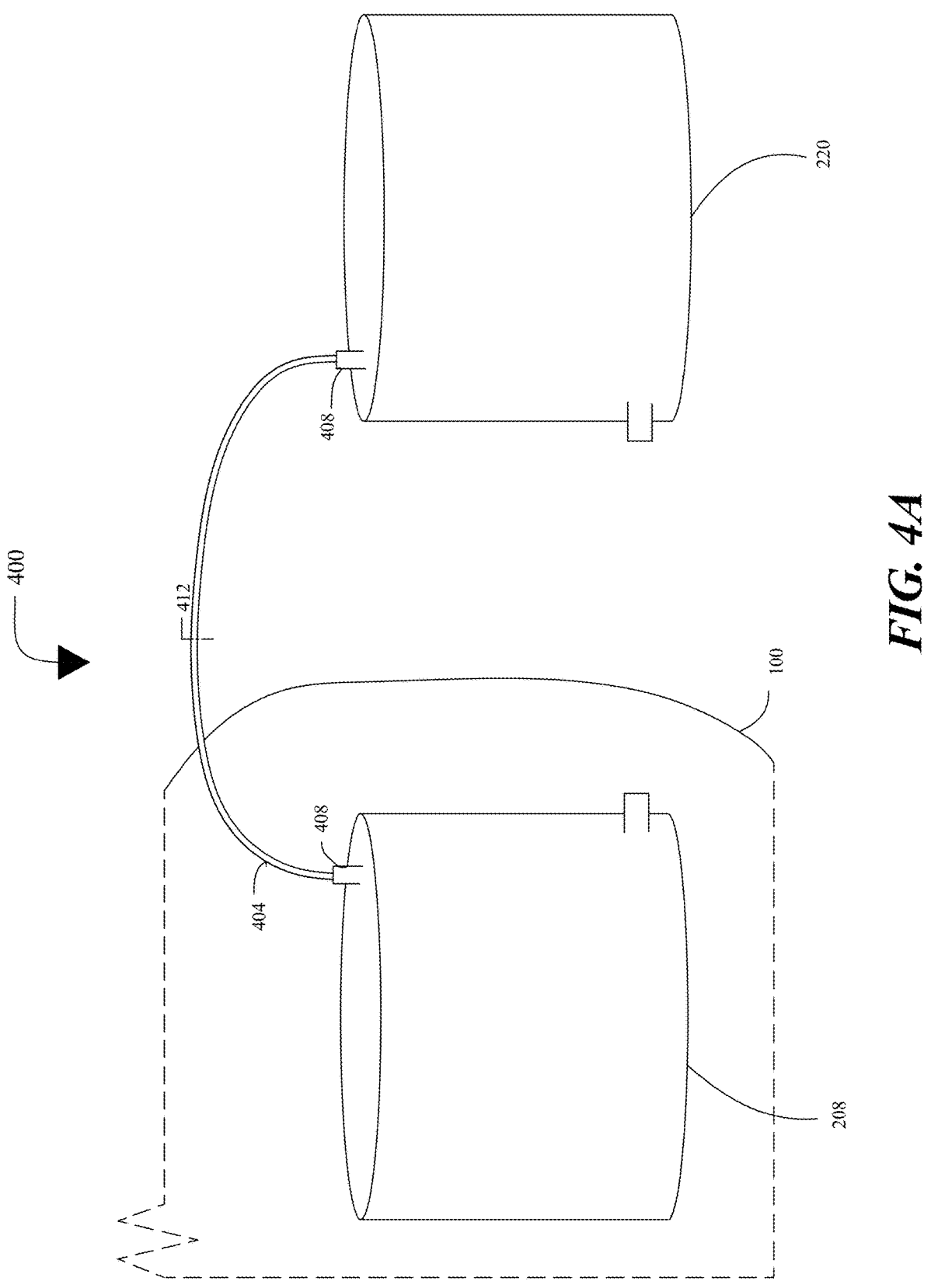
FIGS. 4A and B are schematics of a fuel line.

Now referring to FIG. 4A, a depiction of a vent line 404 connected to two tanks is shown. Vent line 400 may be connected to fuel tank 208 and external tank 220. Vent line may be consistent with any vent line as discussed herein. Vent line may include a mating component to mate with a vent 408 on fuel tank 208 and external tank 220. As used in this disclosure, a "mating component" is a component that is configured to mate with at least another component, for example in a certain (i.e. mated) configuration. Mating component may include a mechanical or electromechanical mechanism. For example, without limitation mating may include an electromechanical device used to join electrical conductors and create an electrical circuit. In some cases, mating component may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of vent line 404. In some cases, mating may be lockable. Vent line 404 may be placed on vent 408 when aircraft 100 is grounded. Vent line 404 may be removed once aircraft 100 is ready for flight.

Figure 4B:
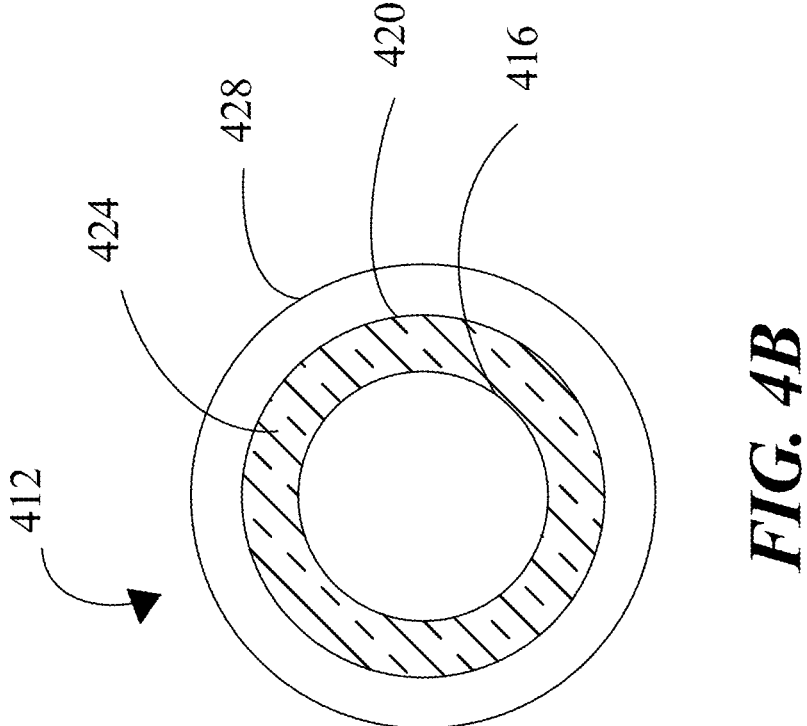

Now referring to FIG. 4B, a cross sectional view 412 of a vent line 404. Vent line 404 may include an inner wall 416 in contact with the fuel, an outer wall 420 in contact with the external environment, and insulation 424 in between the inner and outer wall. Insulation may be a vacuum. Insulation may also be fiberglass, aerogel, or the like. There may be a heating element 428 surrounding the outer wall to prevent a buildup of frozen water vapor and other gases. Heating element may be a hot liquid run through a channel surrounding the vent line 404. As used herein, a "heating element" is a component that emits heat to its surroundings.

Figure 5:
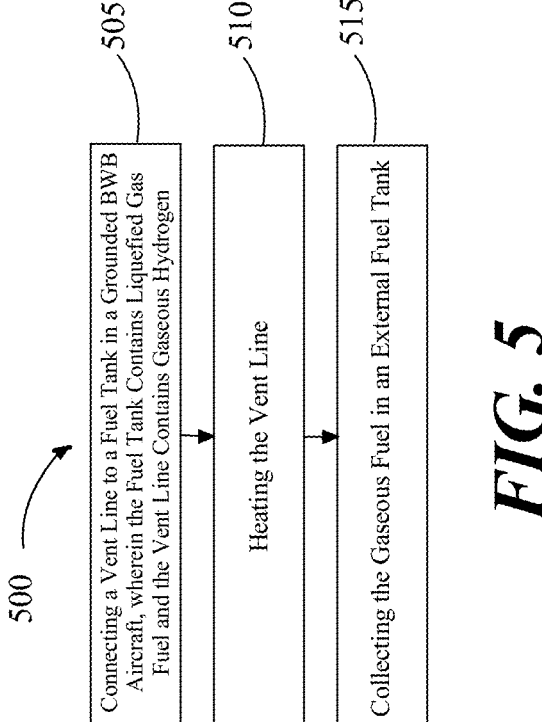
FIG. 5 is a flow diagram of a method for venting a fuel tank.

Now referring to FIG. 5, a method 500 for venting a fuel tank. Step 505 of method 500 includes connecting a vent line to a fuel tank in a grounded blended wing body aircraft, wherein the fuel tank contains liquified gas fuel, and the vent line contains gaseous fuel. Fuel tank may be pressurized. The addition of gaseous fuel from boil-off may increase the pressure in the fuel tank. Tank may include a vent configured to release pressure buildup from the fuel tank. Vent may be connected to a vent line. Vent line may direct gaseous fuel overboard, such as into an external tank. Vent line may be insulated to prevent the accumulation of frozen gases, such as frozen water vapor. Vent line may include an inner wall and an outer wall, wherein a vacuum resides in between. Vacuum may act as an insulation to prevent an accumulation of frozen gases on the outer wall. Vent line may be consistent with any vent line in FIG. 1-4.

Step 510 of method 500 includes heating the vent line. Heating the vent line may warm the extremely cold vented gas. A hot fluid channel may surround the vent line to heat the vent line. Heat may be provided by a powered heat source such as a radiator, electric resistance heater, combustion heater, or the like. Hot fluid channel may be consistent with any hot fluid channel as discussed in FIGS. 1-4.

Step 515 of method 500 includes collecting the gaseous fuel in an external fuel tank. A distal end of the vent line may be connected to an external tank, located overboard the aircraft. External fuel tank may be configured to re-liquefy the gaseous fuel to be used in the aircraft. Re-liquefying the hydrogen gas includes using a refrigeration cycle to change the gas back into liquid fuel. Refrigeration cycle includes condensers, throttle valves, compressors, and heat exchangers.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
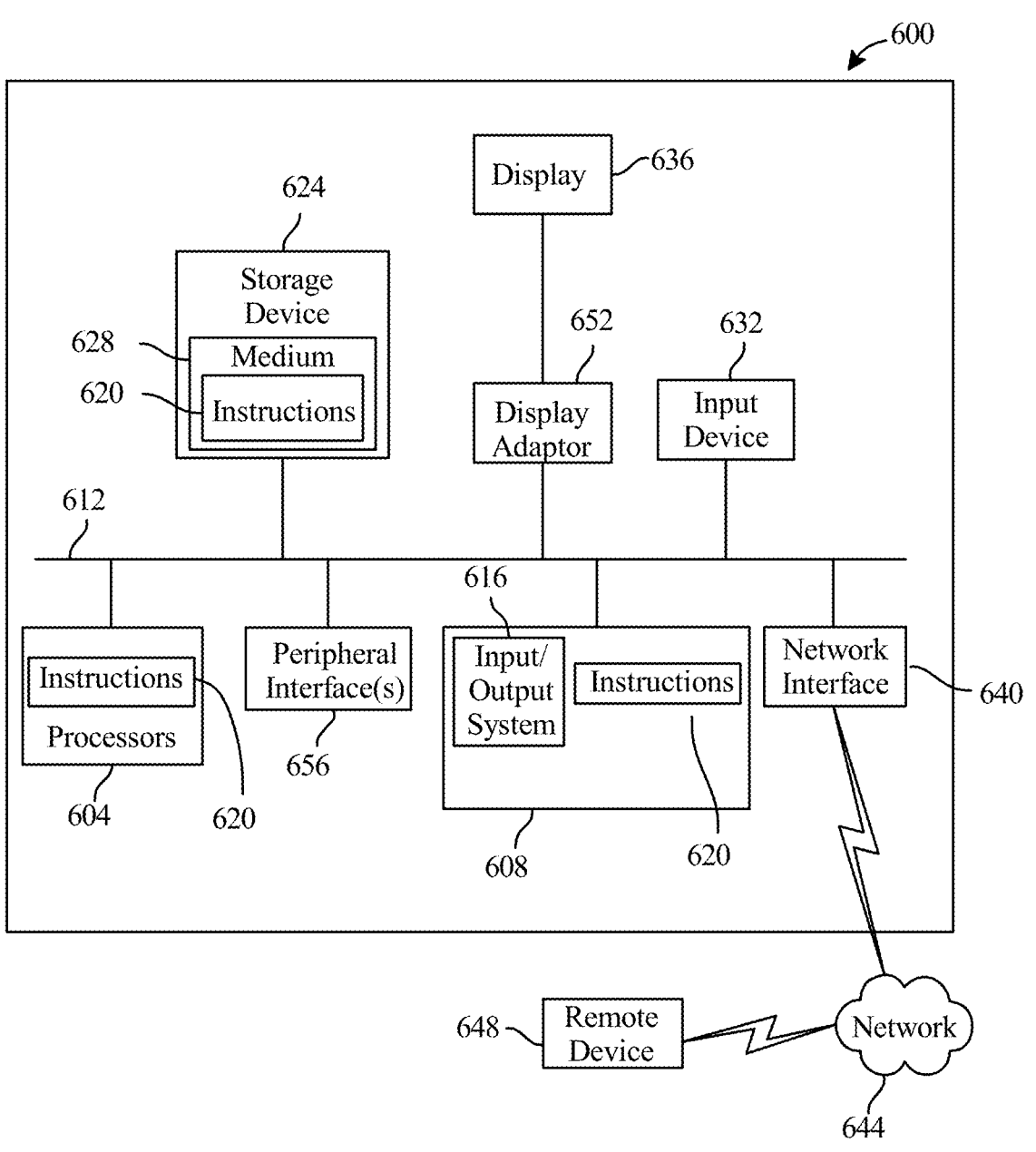
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for venting a fuel tank, the method comprising:

connecting a vent line to the fuel tank in a grounded blended wing body aircraft, wherein the fuel tank contains liquid fuel;

detecting a connection between the vent line and a vent of the fuel tank using a contact sensor;

providing a valve proximal to the connection between the vent of the fuel tank and the vent line, the valve configured to facilitate a continuous flow of gaseous fuel downstream the vent line, from the fuel tank to an external fuel tank, wherein the continuous flow of the gaseous fuel downstream of the vent line prevents ingress of moisture into the valve;

heating the vent line using a heat exchanger, wherein the heat exchanger comprises a hot fluid channel surrounding the vent line; and collecting the gaseous fuel downstream of the vent line, from the fuel tank, in the external fuel tank, wherein the external fuel tank is fluidly connected to the vent line, wherein the collecting the gaseous fuel comprises:

identifying, by a controller onboard the grounded blended wing body aircraft, a fuel pressure of the fuel tank;

controlling, by the controller, an opening of the vent based on the fuel pressure, the connection between the vent line and the vent, and a comparison of the fuel pressure to a threshold pressure, wherein the threshold pressure comprises an increase in the fuel pressure by 3% to 5% of an operating pressure inside the fuel tank;

liquefying, by the external fuel tank, the gaseous fuel; and reusing the liquefied gaseous fuel.

2. The method of claim 1, wherein the liquefying the gaseous fuel comprises chilling the gaseous fuel in the external fuel tank.

3. The method of claim 1, wherein the fuel tank is pressurized.

4. The method of claim 1, wherein the vent of the fuel tank is configured to release pressure buildup from the fuel tank.

5. The method of claim 1, wherein the vent line includes a pressure regulator.

6. The method of claim 1, wherein the vent line is insulated to prevent an accumulation of frozen gases.

7. The method of claim 1, wherein the vent line includes an inner wall and an outer wall wherein a vacuum resides in between.

8. The method of claim 2, wherein the re-liquefying the gaseous fuel includes using a refrigeration cycle comprising condensers, throttle valves, compressors, and heat exchangers.

9. A system for venting a fuel tank, the system comprising:

a grounded blended wing body aircraft, wherein the grounded blended wing body aircraft includes a contact sensor configured to detect a connection between a vent line and a vent of the fuel tank;

the vent line connected to the fuel tank in the grounded blended wing body aircraft;

a valve proximal to the connection between the vent of the fuel tank and the vent line, the valve configured to facilitate a continuous flow of gaseous fuel downstream the vent line, from the fuel tank to an external fuel tank, wherein the continuous flow of the gaseous fuel downstream of the vent line prevents ingress of moisture into the valve;

a heat exchanger configured to heat the vent line, wherein the heat exchanger comprises a hot fluid channel surrounding the vent line; and the external fuel tank configured to collect the gaseous fuel downstream of the vent line from the fuel tank in the grounded blended wing body aircraft, wherein collecting the gaseous fuel comprises:

identifying, by a controller onboard the grounded blended wing body aircraft, a fuel pressure of the fuel tank;

controlling, by the controller, an opening of the vent based on the fuel pressure, the connection between the vent line and the vent, and a comparison of the fuel pressure to a threshold pressure, wherein the threshold pressure comprises an increase in the fuel pressure by 3% to 5% of an operating pressure inside the fuel tank;

liquefying, by the external fuel tank, the gaseous fuel; and reusing the liquefied the gaseous fuel.

10. The system of claim 9, wherein the fuel tank is pressurized.

11. The system of claim 9, wherein the vent of the fuel tank is configured to release pressure buildup from the fuel tank.

12. The system of claim 9, wherein the vent line includes a pressure regulator.

13. The system of claim 9, wherein the vent line is insulated to prevent an accumulation of frozen gases.

14. The system of claim 9, wherein the vent line includes an inner wall and an outer wall wherein a vacuum resides in between.

15. The system of claim 9, wherein the liquefying the gaseous fuel includes using a refrigeration cycle comprising condensers, throttle valves, compressors, and heat exchangers.

* * * * *